(12) United States Patent
Molter

(10) Patent No.: US 8,251,325 B2
(45) Date of Patent: Aug. 28, 2012

(54) ADJUSTABLE DISPLAY BRACKET

(75) Inventor: Daniel E. Molter, Elmhurst, IL (US)

(73) Assignee: Peerless Industries, Inc., Aurora, IL (US)

( * ) Notice: Subject to any disclaimer, the term of this patent is extended or adjusted under 35 U.S.C. 154(b) by 247 days.

(21) Appl. No.: 12/791,183

(22) Filed: Jun. 1, 2010

(65) Prior Publication Data
US 2011/0290971 A1 Dec. 1, 2011

(51) Int. Cl.
A47B 96/00 (2006.01)
(52) U.S. Cl. ......... 248/222.51; 248/221.12; 248/224.51; 248/225.11; 248/274.1; 248/922
(58) Field of Classification Search .................. 248/477, 248/221.12, 222.51, 223.31, 224.51, 222.41, 248/223.21, 225.11, 274.1, 279.1, 299.1, 248/316.8, 912, 917–924; 403/348
See application file for complete search history.

(56) References Cited

U.S. PATENT DOCUMENTS

| | | | |
|---|---|---|---|
| 1,332,618 A * | 3/1920 | Durham | 248/311.2 |
| 3,337,173 A * | 8/1967 | Soderquist et al. | 248/279.1 |
| 3,754,343 A | 8/1973 | Popeil | |
| 4,725,029 A * | 2/1988 | Herve | 248/221.12 |
| 4,784,046 A * | 11/1988 | Gautier | 92/128 |
| 5,068,996 A | 12/1991 | Shank | |
| 5,209,446 A | 5/1993 | Kawai | |
| 5,526,010 A | 6/1996 | Plunk | |
| 5,941,493 A | 8/1999 | Cheng | |
| 5,941,497 A | 8/1999 | Inoue et al. | |
| 6,289,826 B1 * | 9/2001 | Waisbrod | 108/157.1 |
| 6,354,550 B2 | 3/2002 | Jeong | |
| 6,402,109 B1 | 6/2002 | Dittmer | |
| 6,616,369 B2 * | 9/2003 | Clark | 404/10 |
| D488,700 S | 4/2004 | Montague | |
| D489,599 S | 5/2004 | Lam | |
| 6,864,855 B1 | 3/2005 | Fujita | |
| D505,858 S | 6/2005 | O'Keene | |
| 6,905,101 B1 | 6/2005 | Dittmer | |
| 7,243,892 B2 | 7/2007 | Pfister | |
| D549,558 S | 8/2007 | Dittmer et al. | |
| D558,560 S | 1/2008 | Ciungan | |
| D558,561 S | 1/2008 | Ciungan | |
| D558,562 S | 1/2008 | Ciungan | |

(Continued)

FOREIGN PATENT DOCUMENTS

CN 2739669 11/2005

(Continued)

OTHER PUBLICATIONS

U.S. Appl. No. 29/362,825, filed Jun. 1, 2001, Molter.

*Primary Examiner* — Bradley Duckworth
(74) *Attorney, Agent, or Firm* — Foley & Lardner LLP

(57) ABSTRACT

A rotatably adjustable mounting bracket for attachment to a display device and a mounting system affixable to mount surface and providing rotational adjustability of the attached display about an axis substantially perpendicular to the principal plane of the display device. The device mounting bracket including at least one set of openings comprising a plurality of openings located in the plate to substantially align with mounting holes located on the display device. Each of the openings having an adjustment portion adapted to receive a portion of the display device fastener attached to the display device and moveable within the adjustment portion to permit rotational movement of the display device relative to the mounting bracket.

20 Claims, 6 Drawing Sheets

U.S. PATENT DOCUMENTS

| | | |
|---|---|---|
| D558,563 S | 1/2008 | Ciungan |
| D558,564 S | 1/2008 | Ciungan |
| D559,087 S | 1/2008 | Ciungan |
| D559,088 S | 1/2008 | Ciungan |
| D562,113 S | 2/2008 | Ciungan et al. |
| 7,438,269 B2 | 10/2008 | Pfister et al. |
| D581,916 S | 12/2008 | Sculler et al. |
| D587,716 S | 3/2009 | Hau et al. |
| 7,641,163 B2 | 1/2010 | O'Keene |
| 7,726,617 B2 | 6/2010 | Zambelli et al. |
| 7,753,332 B2 | 7/2010 | O'Keene |
| 7,793,903 B2 * | 9/2010 | Dittmer et al. .............. 248/276.1 |
| 7,832,700 B2 * | 11/2010 | Ciungan ...................... 248/324 |
| 2004/0118987 A1 * | 6/2004 | Matko et al. ................ 248/282.1 |
| 2004/0232298 A1 * | 11/2004 | Bremmon et al. ........ 248/281.11 |
| 2006/0291152 A1 * | 12/2006 | Bremmon ..................... 361/681 |
| 2007/0041213 A1 | 2/2007 | Short et al. |
| 2007/0102605 A1 * | 5/2007 | Vela et al. ................. 248/221.12 |
| 2007/0275629 A1 | 11/2007 | Tseng |
| 2008/0035816 A1 | 2/2008 | Ciungan |
| 2008/0308686 A1 | 12/2008 | Boltz et al. |
| 2009/0256040 A1 | 10/2009 | Lee et al. |
| 2010/0193650 A1 * | 8/2010 | Dittmer et al. ........... 248/222.51 |

FOREIGN PATENT DOCUMENTS

| | | |
|---|---|---|
| CN | 2859753 | 1/2007 |

* cited by examiner

ADJUSTABLE DISPLAY BRACKET

FIELD OF THE INVENTION

The present invention relates generally to mounting systems. More particularly, the present invention relates to mounting systems for audio/visual devices, where the rotational orientation of the audio/visual device can be adjusted.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Flat panel display devices have become enormously popular in both commercial and residential sectors. Various television and computer monitor display device technologies, including liquid crystal display (LCD) and plasma displays, are now routinely in use in many businesses and homes. One of the advantages of flat panel television displays that customers have found particular appealing is their relatively low thickness, which permits mounting such a display directly to a mount surface such as a wall or fixture.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. With such large weights involved, it is especially important that users can easily, safely, and securely mount the devices without having to make substantial adjustments. Furthermore, with the high cost of such devices, it is extremely important that the device be mounted correctly on the first attempt: if the device is not correctly mounted on the first try, there is a high risk of damaging the device and causing injury to those installing it.

Many mounting systems include a mounting surface bracket or assembly that is affixed to the mount wall or other surface and a second bracket or assembly that is affixed to the display device and is in turn attached to the mounting surface structure directly or with additional structures. The placement and orientation of the mounting surface structure in relation to the mount surface largely dictates the final placement and orientation of the attached display device. However, it can often be difficult to gauge the orientational accuracy and precision of the attachment of the surface structure to mount surface until the remaining components of the mounting assembly have been assembled and the display is actually mounted. In particular, it can be time consuming to obtain satisfactory rotational orientation of the display such that the display is level in relation to mount surface and surrounding environment. Small deviations in the levelness of the display, for example, when the upper and lower edges of the display are not substantially parallel to the floor and/or ceiling, are easily detectably by viewers and detracts from the viewing experience.

Conventional approaches, such as proper measurement, leveling and templates to secure the mounting system to the mount surface have been only partially successful and can cause inefficiencies during installation. With the challenges associated with obtaining satisfactory rotational orientation of a mounted display, there have been various attempts to develop mounting systems that address these concerns. However, such mounting systems that permit rotational adjustment of the display generally require relatively complex leveling mechanisms that include a number of moving parts and/or interacting features. Although some such systems can adequately level an attached display device, their complexity can make them cumbersome to install, prohibitively expensive for many display installations, and add undesirable thickness to the mounting system to prevent the display from being mounted in close proximity to the mount surface.

SUMMARY

Various embodiments provide an adjustable mounting bracket for use with a variety of display devices, especially display devices such as flat screen televisions, and a variety of mounting systems that are attachable to a mount surface. A display may be efficiently secured to a mount surface using the display bracket because rotational variation in the orientation of the attached display is conveniently corrected during installation through adjustment of the display relative to the mounting bracket. Thus, rotational imprecision in the attachment of the mounting system to the mount surface and manufacturing variance may be readily compensated for in the final installation. Additionally, the mounting bracket may be constructed to permit more significant rotational adjustments of the attached display, such as moving the display between landscape and portrait orientations. The device mounting bracket provides adjustability through a relatively straightforward arrangement that does not require complex assemblies or moving components, making it suitable for a wide variety of displays and display sizes.

In an embodiment, the adjustable mounting bracket comprises a device mounting plate that includes a device mounting surface for operative attachment to a display device and includes a rear surface opposing the device mounting surface. The device mounting plate includes at least one device opening group with a plurality of initial device fastener openings through the device mounting plate that have a key aperture, an adjustment channel substantially aligned with a first arc disposed about a device rotation axis, and a passage channel between the key aperture and the adjustment channel. The device opening group also includes a plurality of complementary device fastener openings through the device mounting plate that include an adjustment channel substantially aligned with the first arc. The attached display device is selectively positionable to a rotation angle by movement of the display device about the device rotation axis defined by relative movement of the plurality of display device fasteners in relation to the respective plurality of adjustment channels.

In another embodiment, an adjustable mounting system comprises at least one mount arm operatively attachable to the mounting surface at a first end and a device mounting plate that defines a mount plane and is operatively coupled to a second end of the at least one mount arm. The mounting plate is attachable to a display via a plurality of display device fasteners that are coupled to the display. The device mounting plate includes at least one set of device fastener openings through the device mounting plate, which receive the display device fasteners. Each of the openings includes an adjustment channel that defines an adjustment path parallel to the mount plane for the respective display device fastener. At least one of the openings includes a key aperture dimensioned to receive a head of one of the plurality of display device fasteners. The display is selectively moveable parallel to the mounting plane by movement of the plurality of display device fasteners along the respective adjustment paths.

In yet another embodiment, a device mounting plate is operatively securable to a mounting surface for rotatable mounting, with a plurality of device fasteners, an audio/visual device. The device mounting plate comprises a first plurality of device openings through the device mounting plate. Each of the first plurality of device openings includes a key portion that is dimensioned to receive a device fastener previously associated with the audio/visual device and a substantially arcuate adjustment portion that enables travel of the device fastener substantially parallel to the principal plane of the mounting plate and establishes a rotational angle of the audio/visual device. The device mounting plate also includes a second plurality of device openings through the device mounting plate that are configured to receive one of the plurality of device fasteners. The adjustment portions of the first plurality of device openings and the adjustment portions of the second plurality of device openings are arranged in the device mounting plate to substantially correspond with a first predefined device fastener pattern.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

FIGS. 1-6B show a device mounting bracket 100 constructed in accordance with an embodiment of the present invention that is attachable to a display 20 and may be used with a device mounting system such as the portion of mounting system 10 depicted. The mounting system 10 secures the display 20, which may be an audio/visual device such as an LCD or plasma flat panel television, to a mount surface via the device mounting bracket 100 that is operatively affixable to the mount surface, which may be a wall, ceiling or other structure. The mounting system 10 may include various components known in the art to affix the device mounting bracket 100 to the mount surface such as the depicted at least one mounting arm 30. The at least one mounting arm 30, for example, can be directly coupled to the mount surface or associated with additional components (not shown), including surface mounting brackets, further mounting arms, and other components known in the art, to operatively affix the device mounting bracket 100 to the mount surface. Affixture of the mounting system 10 in relation to the mount surface generally defines an initial rotational angle orientation of the display 20 in the principal plane of the display 20.

Figure 1:
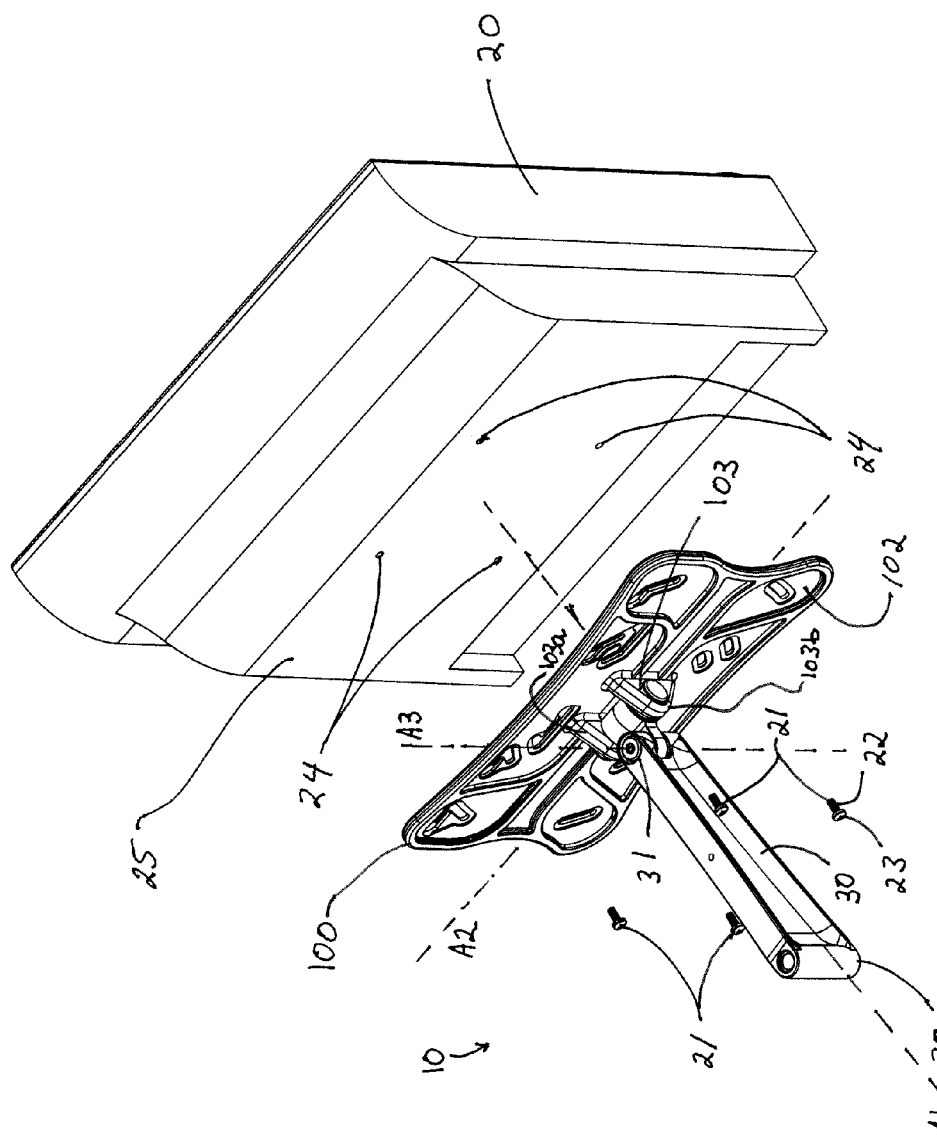
FIG. 1 is a perspective view of a display mounting bracket for use with a display mounting system to adjustably mount a separate display device in accordance with an embodiment of the present invention.
Figure 2:
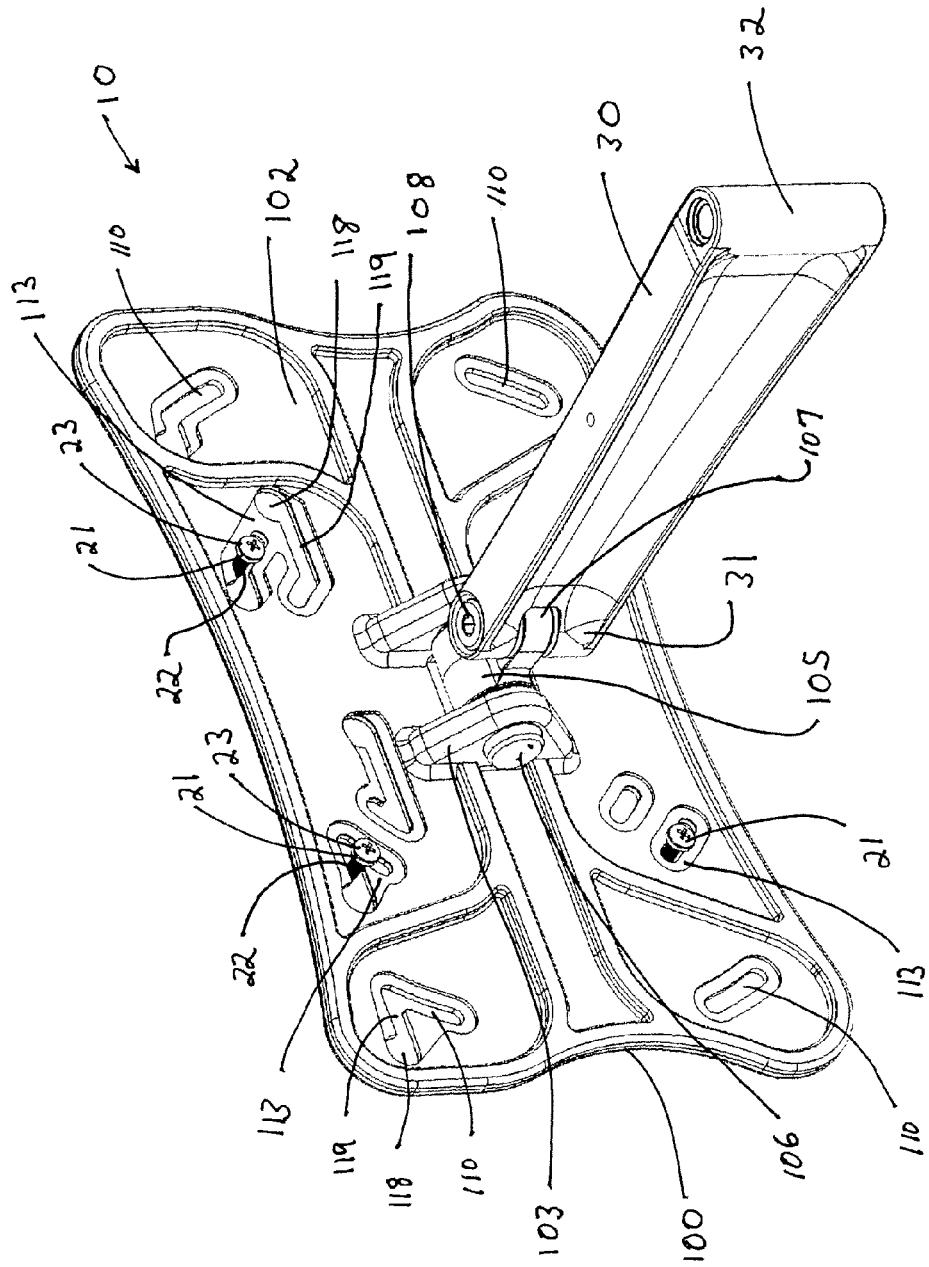
FIG. 2 is a top perspective view showing the display mounting bracket and the portion of the display mounting system of FIG. 1.
Figure 5:
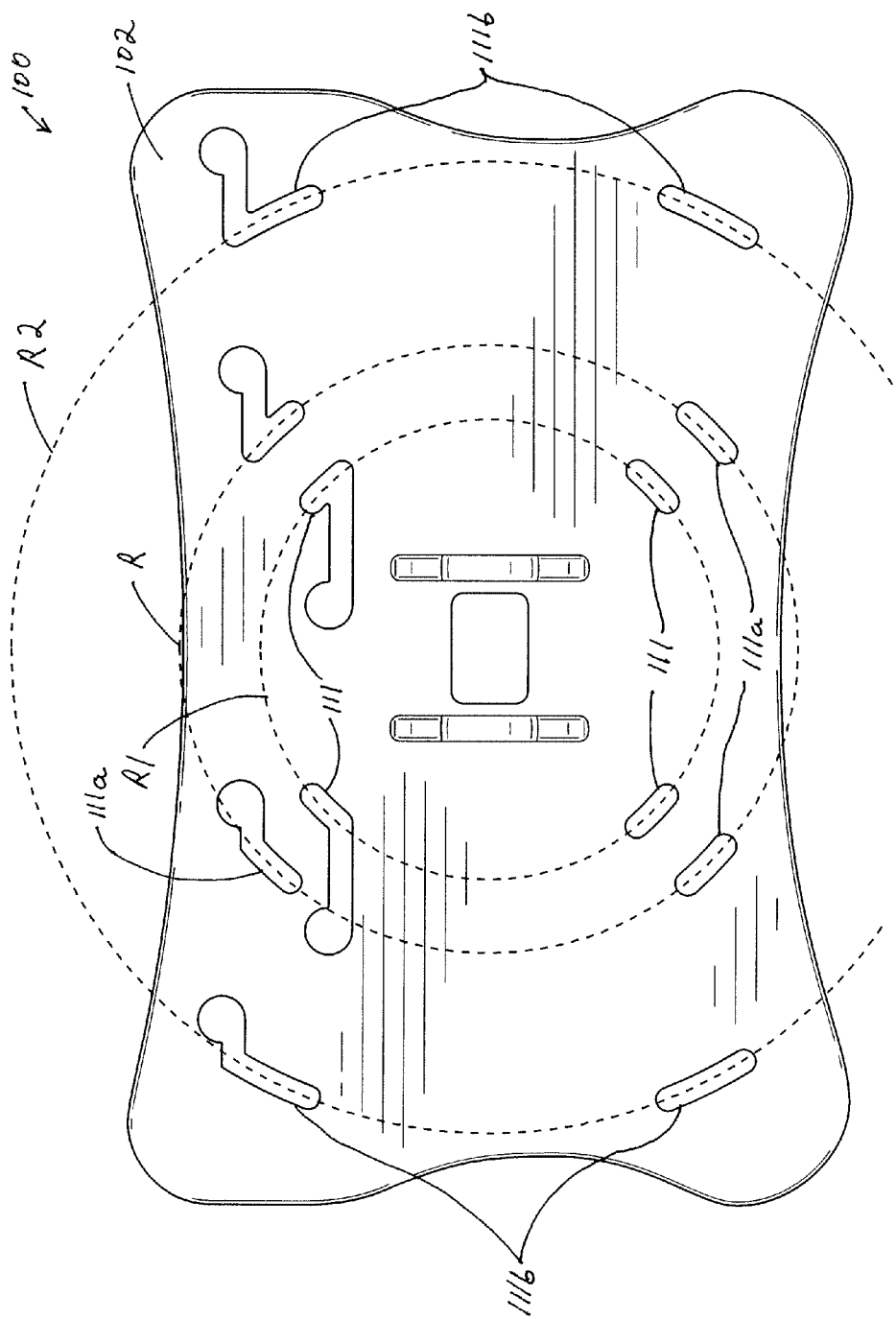
FIG. 5 is a front plan view of the display mounting bracket of FIG. 3.

With reference to FIGS. 2 and 5, the device mounting bracket 100 includes a device mounting surface 101 and a rear surface 102 opposite the device mounting surface 101. The device mounting surface 101 and the rear surface 102 are generally substantially parallel with the principal plane of the device mounting bracket 100. As shown in FIG. 1, the device mounting surface 101 may be directly coupled to the display 20, including various flat panel televisions and other electronic displays. However, in other configurations an adapter bracket (not shown) or other structures may be disposed between the device mounting surface 101 and the display 20. A plurality of display device fasteners 21 are used to couple the device mounting bracket 100 to the display 20. As shown the plurality of display device fasteners 21 interface with display fasteners holes 24 in the display 20. The display fastener holes 24 are typically located on a rear surface 25 of the display 20 in a predefined fastener hole pattern.

The rear surface 102 of the device mounting bracket 100 is configured to operatively attach the device mounting bracket 100 to the mounting surface. As shown in FIG. 2, a surface bracket 103 extends from the rear surface 102 and is coupled to the at least one mounting arm 30 which is operatively secured to the mounting surface. The surface bracket 103 comprises a pair of vertically orientated flanges 103a and 103b that are separated by a central void. The surface bracket 103 is located at approximately the center of the device mounting bracket 100. The surface bracket 103 may be integral with the device mounting bracket 100 or a separate component affixed to the device mounting bracket 100 by welding, fasteners or other techniques known in the art. The surface bracket 103 may pivotally couple the rear surface 102 to the mounting arm, allowing for adjustment of the orientation of the device mounting bracket 100 and attached display 20 after installation of the mounting system 10 relative to the mount surface.

Figure 3:
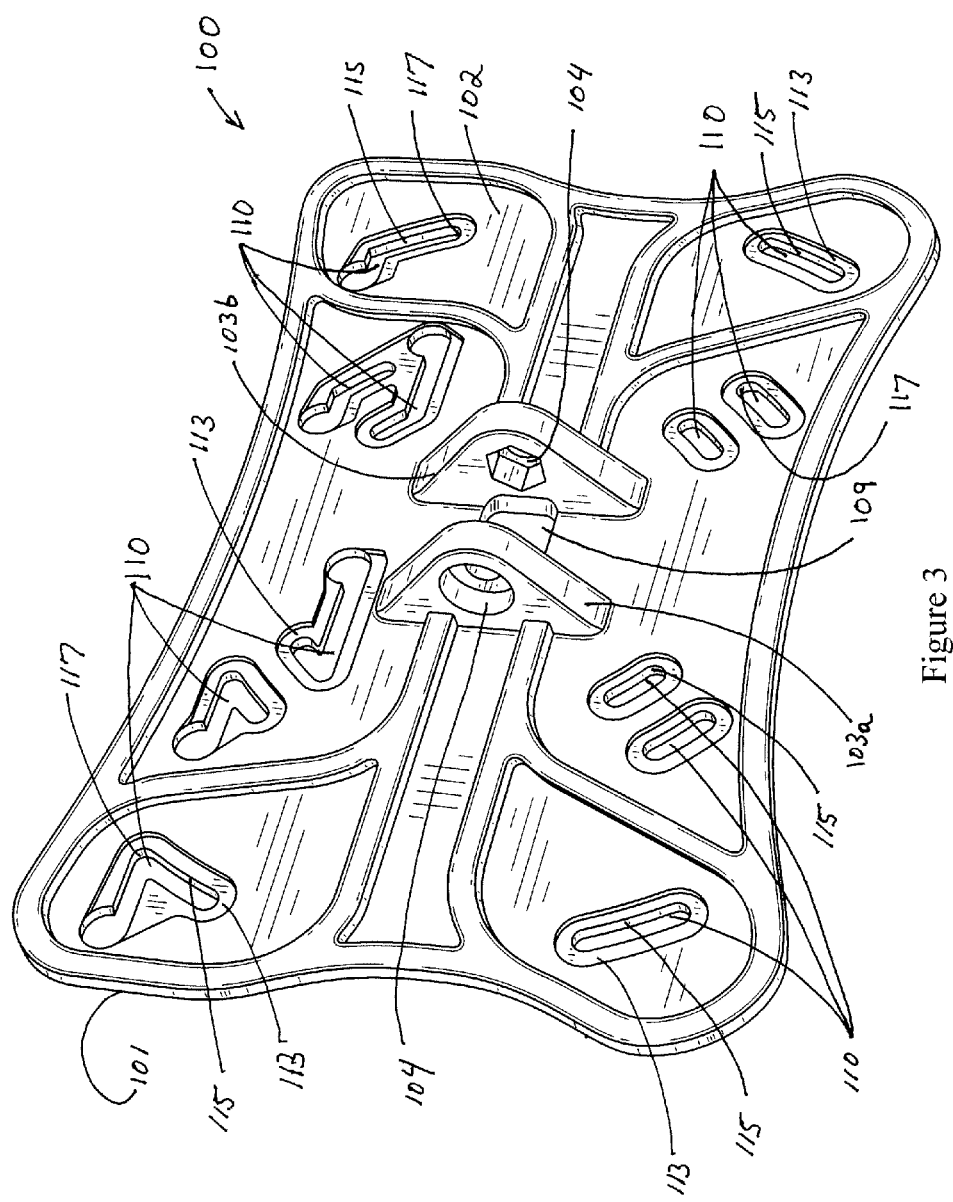
FIG. 3 is a bottom perspective view showing the display mounting bracket of FIG. 1.
Figure 4:
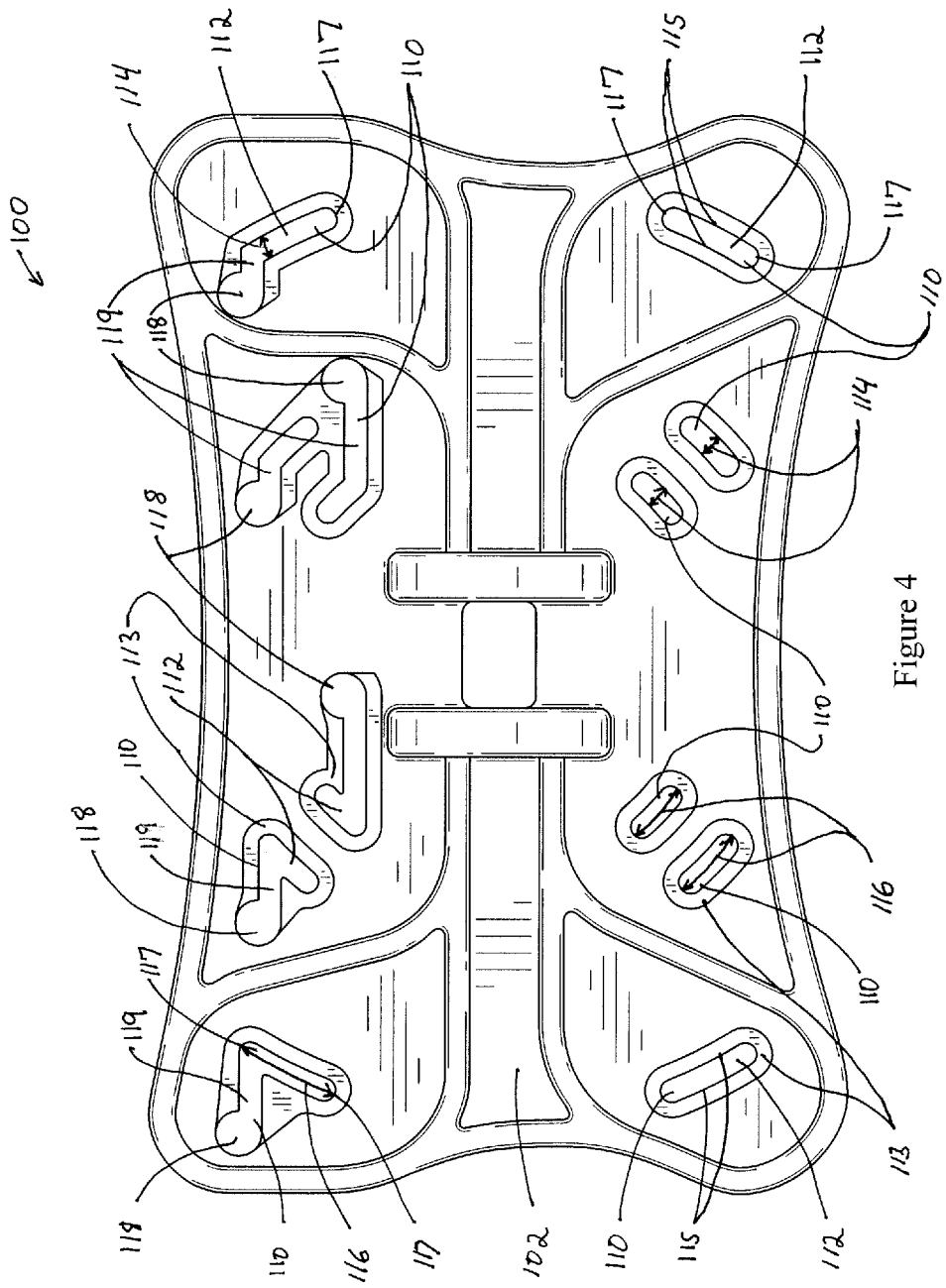
FIG. 4 is a rear plan view of the display mounting bracket of FIG. 3.

Although a number of various arrangements of the surface bracket 103 may be used with the device mounting bracket 100, the embodiment depicted in FIGS. 1 and 2 includes a tilt assembly 105 that is at least partially received within the central void between the pair of flanges 103a and 103b and rotatably coupled to the surface bracket 103. As shown in FIG. 4, the device mounting bracket 100 may also include a relief 109 through which a portion of the tilt assembly 105 can extend and reduce the overall profile or thickness of the mounting system 10 such that it may be located in close proximity to the mount surface. With reference to FIG. 3, the surface bracket 103 includes bracket tilt apertures 104 located in the pair of flanges 103a and 103b that are adapted to receive a tilt axle 106 associated with the tilt assembly 105. The surface bracket 103 has a low profile such that the bracket tilt apertures 104 (and the tilt axle 106) are located proximate the rear surface 102. As shown, one or more of the bracket tilt apertures 104 may be keyed or otherwise adapted to prevent slippage of tilt assembly 105 with respect to the device mounting bracket 100. With reference to FIG. 1, the surface bracket 103 is thus pivotable about a second axis A2 through the tilt axle 106. Depending on the orientation of the device mounting bracket 100, the axis A2 may be substantially horizontally orientated, as shown, to provide up/down tilt adjustability for the attached display 20, or vertically orientated to provide left/right pivoting adjustability. The tilt assembly 105 is may be configured for attachment to the mounting surface, another structure, or as shown, coupled to the at least one mounting arm 30.

As shown in FIGS. 1 and 2, the tilt assembly 105 is also pivotally coupled to the at least one mounting arm 30 about a third axis A3 that is substantially perpendicular to the axis A2. A tongue portion 107 of the tilt assembly 105 includes an aperture that receives a pivot axle 108 that is rotatably coupled to a first end 31 of the at least one mounting arm 30. In the depicted embodiment, the tilt assembly 105 is thus also pivotly adjustable about the axis A3. The at least one mounting arm 30 is operatively securable to the mounting surface via a second end 32 that may be directly secured to mount surface or fixedly or otherwise moveably coupled to additional mounting structures that are attachable to the mount surface and are known in the art.

The device mounting bracket 100 is affixable to the display 20 with the plurality of display device fasteners 21 that are securable to the display 20. As shown in FIGS. 1 and 2, the plurality of display device fasteners 21 engage the rear surface 102 and extend through the device fastener openings 110 in the device mounting bracket 100. The plurality of display device fasteners 21 protrude beyond the device mounting surface 101 where they engage the display fasteners holes 24 generally located on a rear portion of the display 20. The device fastener openings 110 are arranged in the device mounting bracket 100 in one or more fastener patterns 111. The fastener pattern 111 is configured to located the plurality of the display device fasteners 21 to securely support and affix the display 20 to the device mounting bracket 100. In various embodiments, the device mounting bracket 100 includes one or more fastener patterns 111 that substantially correspond with a pattern of the display fasteners holes 24 located on the display 20.

Each of the fastener patterns 111 on the device mounting plate 100 may correspond with commonly used and/or standardized fastener hole patterns that are found on various displays 20. In the case of electronic displays such as flat panel televisions, one or more fastener patterns 111 may substantially correspond to one or more display mounting interface standards, such as standards promulgated by the Video Electronics Standards Association (VESA) (although other patterns are also possible). The VESA mounting standards, including the MIS-D 75, MIS-D 100, MIS-E and MIS-F standards, which are incorporated herein by reference, define the horizontal and vertical spacing of the hole pattern defining the display fasteners holes 24 and the fastener size. The various VESA standards, for example, define a pattern of four display fasteners holes 24 that are arranged in a square or rectangular pattern with horizontal and vertical spacing, which are summarized in Table 1.

TABLE 1

| Standard | Horizontal and Vertical Distances | Fastener Size |
|---|---|---|
| MIS-D 75 | 75 mm × 75 mm | M4 |
| MIS-D 100 | 100 mm × 100 mm | M4 |
| MIS-E | 200 mm × 100 mm | M4 |
| MIS-F | 200 mm × 200 mm | M6 or M8 |
| | 400 mm × 400 mm | |
| | 600 mm × 200 mm | |
| | 600 mm × 400 mm | |
| | 800 mm × 400 mm | |
| | 280 mm × 150 mm | |

As shown in FIG. 4, the device fastener openings 110 include an elongate portion 112 capable of receiving a shank portion 22 of the display device fastener 21. A head portion 23 of the display device fastener 21, which is of a greater diameter than the shank portion 22, is engageable with an engagement surface 113 associated with the rear surface 102 and that at least partially surrounds the elongate portion 112. The elongate portion 112 is defined by a channel width 114 between the lateral channel surfaces 115 and a channel length 116 between the channel ends 117. The channel width 114 is adapted to receive the shank portion 22 with sufficient clearance to permit travel of the display device fastener 21 along the channel length 116 without interference or binding of the other display device fasteners 21 within its respective device fastener opening 110 while providing sufficient engagement surface area between the head portion 23 and the engagement surface 113 to secure the display 20 when the display device fastener 21 is tightened. Additional engagement surface area may be achieved by including a washer (not shown) between the head portion 23 and the engagement surface 113, which may be recessed or raised from other areas of the rear surface 102.

The channel length 116 of the elongate portion 112 defines the range of angular rotation of the display 20 about the axis A1 depicted in FIG. 1. With reference to FIGS. 3 and 4, in various embodiments of the device mounting bracket 100, the device fastener openings 110 are provided with a channel length 116 sufficient to correct for rotational misalignment of the attached display 20 resulting from imprecision in the attachment of the mounting system 10 to the mount surface, manufacturing variance associated with the mounting system 10 or display 20, or other sources of installation or component variation. In a particular embodiment, the channel length 116 is defined to provide up to about 10 degrees of rotation of the display device 20 when affixed to the mounting bracket 100. In other embodiments, the elongate portion 112 is extended so that channel length 116 provides an increased range of angular rotation for the attached display 20. For example, the channel length 116 may be defined to provide up to about 90 degrees of rotation, allowing the display 20 to be selectively positioned between landscape, portrait and intermediate orientations. In still further embodiments, the device mounting bracket 100 may be configured such that the elongate portion 112 of the various device fastener openings 110 form a continuous channel or slot in the device mounting bracket 100. In such an embodiment, the display 20 may be rotated fully 360 degrees in relation to the device mounting bracket 100.

Each of the device fastener openings 110 is located in the device mounting bracket 100 such that a portion of the elongate portion 112 of each device fastener opening 110 is positionable over a corresponding device fastener hole in the display 20. To allow relative rotation between the display 20 and the device mounting bracket 100 about a first axis A1 that is substantially perpendicular to the principal plane of the device mounting bracket 100, the lateral channel surface 115 of the elongate portions 112 may be substantially aligned relative to an arcuate R defined by the axis A1. As such, the lateral channel surfaces 115 may have an arc shape in various embodiments. In other embodiments, lateral channel surfaces 115 may be segmented to substantially align with the arcuate R or may be substantially straight. As shown in FIG. 5, each of the elongate portions 112 are curved and aligned with the arcuates R, R1 and R2, each having a different diameter that correspond with a particular fastener pattern 111.

One or more of the device fastener openings 110 may include a key aperture portion 118. The key aperture portion 118 is sized to be larger than the channel width 114 of the elongate portion 112 such that the head portion 23 of the fastener is received through the device fastener opening 110 via the key aperture portion 118. The key aperture portion 118 may be located along the elongate portion 112 or, as shown in FIG. 4, the key aperture portion 118 is laterally offset from the elongate portion 112. In embodiments where the key aperture portion 118 is offset, a passage portion 119 couples the key aperture portion 118 and the elongate portion 112. By sliding the display 20 relative to the device mounting bracket 100 when partially attached, the display device fastener 21 received by the key aperture portion 118 may be moved between the key aperture portion 118 and the elongate portion 112 to facilitate attachment and removal of the display 20 with the device mounting bracket 100.

With reference to FIG. 4, each of the fastener patterns 111 include four of the device fastener openings 110, with two of the device fastener openings 110 including the key aperture portion 118. In the depicted embodiment, the key aperture portions 118 are associated with the device fastener openings 110 located along the upper portion of the fastener pattern 111. However, in other embodiments, the key aperture portion 118 may be associated with more, fewer or different device fastener openings 110 or the key aperture portion 118 may be eliminated all together. In those embodiments where the fastener pattern includes a plurality of the key aperture portions 118, the key aperture portions 118 and passage portion 119 may be arranged with respect to the elongate portion 112 so that no more than one display device fastener 21 is proximate the key aperture portion 118 or passage portion 119 at a particular rotational angle of the display 20.

In operation, the display 20 may be mounted to the fastener pattern 111 by first coupling the display device fasteners 21 to the upper row of the display fastener holes 24 of the display 20. The display 20 is then brought into proximity with the device mounting surface 101 of the device mounting bracket 100 such that the attached display device fasteners 21 are inserted through the key aperture portion 118 from the device mounting surface 101 and extending to the rear surface 102, temporarily coupling the display 20 to the device mounting bracket 100. The display 20 can then be moved relative to the device mounting bracket 100 to shift the attached display device fasteners 21 along the passage portion 118 to the elongate portion 112. Additional display device fasteners 21 are inserted through the elongate portion 112 and coupled to the remaining device fastener holes 24 in the display 20 associated with the fastener pattern 111.

Figure 6A:
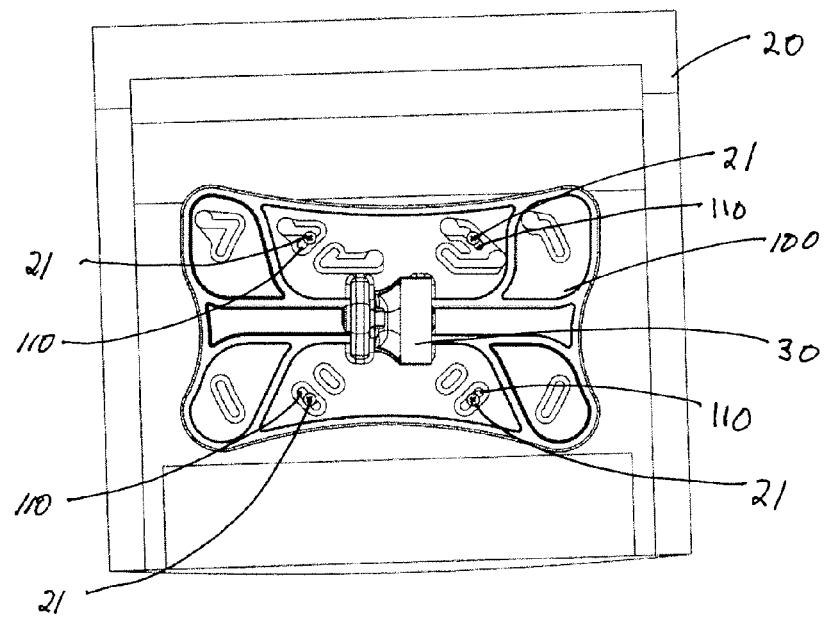
FIG. 6A is a rear plan view of the display mounting bracket and the portion of the display mounting system of FIG. 1 shown coupled to a display device at a first display rotational angle.
Figure 6B:
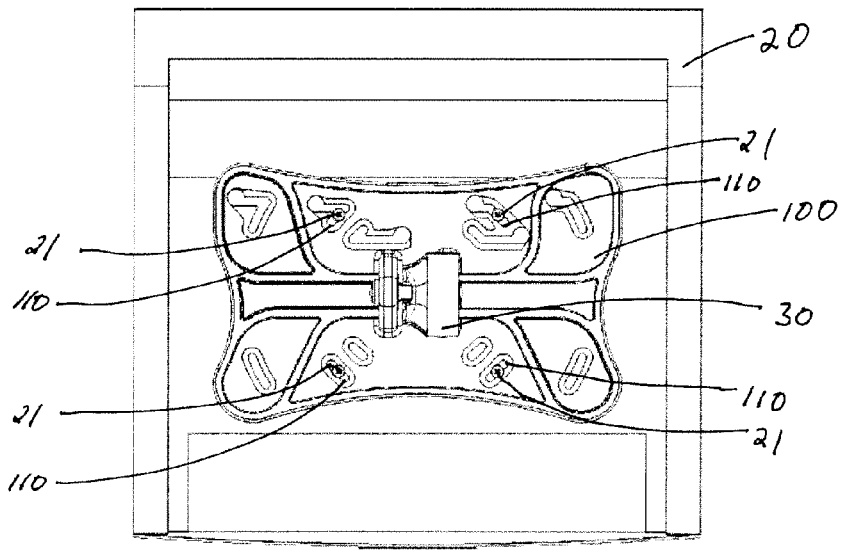
FIG. 6B is a rear plan view of the display mounting bracket and the portion of the display mounting system coupled to the display device of FIG. 1 shown rotated to a second display rotational angle.

As shown in FIGS. 6A and 6B, the display 20 is rotatable relative to the device mounting bracket 100 about the axis A1 to a desired rotation angle. In rotating the display 20, the display device fasteners 21 travel within the elongate portion 112. The display 20 is then secured at the desired rotation angle by tightening the display device fasteners 21 to interface with the engagement surface 113. Alternatively, and in embodiments that lack the key aperture portion 118, the display 20 can be attached to the device mounting bracket 100 by introducing each of the display device fasteners 21 through the device mounting bracket 100 to the device fastener holes 24 via the rear surface 102.

With reference to FIG. 5, the device mounting bracket 100 may include one or more additional sets of the fastener pattern 111 positioned to correspond with other display mounting hole patterns, including various standard mounting hole patterns. The additional fastener patterns 111 may be characterized by different placements of the device fastener openings 110 on the device mounting bracket 100, larger and/or smaller openings to accommodate fasteners of certain diameters, and various horizontal spacing and/or vertical spacing between the device fastener openings 110. Including multiple sets of the fastener pattern 111 allows a single device mounting bracket 100 to be employed with a wide variety of display types and display dimensions. In the depicted embodiment, the device mounting bracket 100 includes three sets of fastener patterns 111, 111a and 111b having different horizontal spacing and/or vertical spacing between the respective device fastener openings 110. In a particular embodiment, the three sets of fastener patterns 111, 111a and 111b correspond with the VESA MIS-D 75, MIS-D 100 and MIS-E, respectively. However, in other embodiments different standard and non-standard patterns may be applied. The device mounting bracket 100 may be included with more or fewer of the fastener patterns 111. In practice, the appropriate fastener pattern 111 is selected to correspond with the fastener hole pattern on the display 20 that is to be mounted with the mounting system 10.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. An adjustable mounting bracket for attachment of a display device to a mounting surface, comprising:
    a device mounting plate including a device mounting surface configured for operative attachment to the display device and a rear surface opposing the device mounting surface;
    at least one device opening group configured to receive a plurality of display device fasteners characterized by a fastener head and a fastener shank engageable with the display device, the at least one device opening group comprising:
        a plurality of initial device mount openings through the device mounting plate, each of the plurality of initial device mount openings including a key aperture dimensioned to receive the fastener head, an adjustment channel dimensioned to receive the fastener shank and substantially aligned with a first arc disposed about a device rotation axis substantially perpendicular to the device mounting surface, and a passage channel between the key aperture and the adjustment channel; and
        a plurality of complementary device mount openings through the device mounting plate, each of the plurality of complementary device mount openings including an adjustment channel substantially aligned with the first arc; and
    a surface bracket coupled to the rear surface and operatively attachable to the mounting surface,
    wherein the display device is selectively positionable to a rotation angle by movement of the display device about the device rotation axis as defined by relative movement of the plurality of display device fasteners in relation to the respective plurality of adjustment channels.

2. The adjustable mounting bracket of claim 1, wherein the key aperture is offset from the first arc.

3. The adjustable mounting bracket of claim 1, wherein the adjustment channel is characterized by a channel width less than the diameter of the fastener head.

4. The adjustable mounting bracket of claim 1, wherein the horizontal distance and the vertical distance separating each of the plurality of initial openings and each of the plurality of complementary openings of the at least one device opening group are substantially equal.

5. The adjustable mounting bracket of claim 1, wherein the at least one device opening group comprises a plurality of device opening groups, and wherein the adjustment channels of each of the plurality of device opening groups is substantially aligned with an arc characterized by a rotational radius greater than the rotational radius of the first arc.

6. The adjustable mounting bracket of claim 5, wherein the rotational radius of the plurality of device opening groups is selected from the group consisting of about 53 mm, about 70.7 mm, about 111.8 mm, and about 141.4 mm.

7. The adjustable mounting bracket of claim 1, wherein the adjustment channels are substantially straight.

8. The adjustable mounting bracket of claim 1, wherein the surface bracket includes a first pivot adapted to provide relative rotation between the device mounting plate and the mounting surface about a substantially horizontal axis and a second pivot adapted to provide relative rotation between the device mounting plate and the mounting surface about a substantially vertical axis.

9. An adjustable mounting system for mounting a display to a surface, comprising:
  at least one mount arm operatively attachable to the mounting surface at a first end; and
  a device mounting plate defining a mount plane and operatively coupled to a second end of the at least one mount arm and attachable to the display via a plurality of display device fasteners coupled to the display, the device mounting plate including at least one set of device fastener openings comprising a plurality of openings through the device mounting plate and configured to receive the display device fasteners, each of the openings including an adjustment channel defining an a non-linear adjustment path parallel to the mount plane for the respective display device fastener and at least one key aperture dimensioned to receive a head of one of the plurality of display device fasteners and in communication with one of the openings, the adjustment channel having a channel length defining a range of angular rotation of the display relative to device mounting plate when the display is engaged with the mounting plate,
  wherein the display is selectively moveable parallel to the mount plane by movement of the plurality of display device fasteners along the respective adjustment paths.

10. An adjustable mounting system for mounting a display to a surface, comprising:
  at least one mount arm operatively attachable to the mounting surface at a first end; and
  a device mounting plate defining a mount plane and operatively coupled to a second end of the at least one mount arm and attachable to the display via a plurality of display device fasteners coupled to the display, the device mounting plate including at least one set of device fastener openings comprising a plurality of openings through the device mounting plate and configured to receive the display device fasteners, each of the openings including an adjustment channel defining an adjustment path parallel to the mount plane for the respective display device fastener and at least one key aperture dimensioned to receive a head of one of the plurality of display device fasteners and in communication with one of the openings,
  wherein the display is selectively moveable parallel to the mount plane by movement of the plurality of display device fasteners along the respective adjustment paths, wherein the adjustment paths define an arcuate, and wherein movement of the plurality of display device fasteners along the respective adjustment paths is characterized by a rotation of the display about an axis substantially perpendicular to the mount plane.

11. The adjustable mounting system of claim 10, wherein the plurality of openings are arranged in a substantially rectangular pattern about the device mounting plate and characterized by a horizontal distance between the display fasteners and a vertical distance between the display fasteners, and wherein the adjustment channels are substantially equidistant from the axis.

12. The adjustable mounting system of claim 11, wherein the at least one set of device fastener openings comprises multiple sets of device fastener openings, and wherein each set of the device fastener openings is characterized by at least one of the horizontal distance and the vertical distance being different from the other sets of the device fastener openings.

13. The adjustable mounting system of claim 11, wherein the horizontal distance and the vertical distance are respectively selected from the group consisting of 75 mm ×75 mm, 100 mm×100 mm, 200 mm×100 mm, and 200 mm×200 mm.

14. The adjustable mounting system of claim 10, wherein the adjustment channel has a channel width of between about 4.5 mm and about 6.5 mm.

15. The adjustable mounting system of claim 10, wherein the adjustment channel has a channel length dimensioned such that the adjustment path provides a range of the rotation of about 10 degrees.

16. A device mounting plate operatively securable to a mounting surface for rotatably mounting, with a plurality of device fasteners, an audio/visual device thereto, comprising:
  a first plurality of device openings through the device mounting plate, each of the first plurality of device openings including a key portion dimensioned to receive a device fastener previously associated with the audio/visual device and a substantially arcuate adjustment portion enabling travel of the device fastener substantially parallel to a principal plane of the mounting plate and selectively establishing a rotational angle of the audio/visual device about an axis substantially perpendicular to the principal plane;
  a second plurality of device openings through the device mounting plate, each of the second plurality of device openings configured to receive one of the plurality of device fasteners and including an adjustment portion enabling travel of the device fastener substantially parallel to the principal plane of the mounting plate; and
  an engagement surface located proximate the adjustment portions engageable with a portion of each of the plurality of device fasteners to secure to the audio/visual device to the device mounting plate at the rotational angle,
  wherein the adjustment portions of the first plurality of device openings and the adjustment portions of the second plurality of device openings are arranged in the device mounting plate to substantially correspond with a first predefined device fastener pattern.

17. The device mounting plate of claim 16, wherein the key portions are displaced from the adjustment portions, and wherein each of the first plurality of device openings further includes a passage portion linking the key portion and the adjustment portion.

18. The device mounting plate of claim 16, further comprising a third plurality of device openings and a fourth plurality of device openings arranged in the device mounting plate to substantially correspond with a second predefined device fastener pattern.

19. The device mounting plate of claim 16, wherein the adjustment portion of the second plurality of openings are characterized by an arcuate.

20. The device mounting plate of claim 16, wherein the rotational angle is selectively adjustable up to about 10 degrees.

* * * * *